US 6,556,460 B2

(12) United States Patent
Ishida et al.

(10) Patent No.: US 6,556,460 B2
(45) Date of Patent: Apr. 29, 2003

(54) METHOD FOR CONTROLLING A VEHICLE PROVIDED WITH AN ELECTRIC POWER CONVERTER

(75) Inventors: Seiji Ishida, Hitachi (JP); Toshiaki Okuyama, Tokai (JP); Tetsuo Kojima, Hitachinaka (JP); Kiyoshi Nakata, Iwase (JP); Akira Horie, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/212,841

(22) Filed: Aug. 7, 2002

(65) Prior Publication Data

US 2003/0043605 A1 Mar. 6, 2003

Related U.S. Application Data

(63) Continuation of application No. 10/101,529, filed on Mar. 20, 2002.

(30) Foreign Application Priority Data

Aug. 29, 2001 (JP) ......................................... 2001-259098

(51) Int. Cl.[7] .................................................. H02M 1/14
(52) U.S. Cl. .................... 363/39; 363/46; 363/56.01; 180/65.1
(58) Field of Search .............................. 363/39, 40, 41, 363/45, 46, 47, 55, 56.01, 98; 180/65.1, 65.2

(56) References Cited

U.S. PATENT DOCUMENTS 3,600,663 A * 8/1971 Wagner ........................ 363/46
5,218,520 A * 6/1993 Rozman et al. ................ 363/39
6,370,050 B1 * 4/2002 Peng et al. .................... 363/98

FOREIGN PATENT DOCUMENTS

JP          57-145503          9/1982

* cited by examiner

Primary Examiner—Jessica Han
(74) Attorney, Agent, or Firm—Crowell & Moring LLP (57) ABSTRACT

The voltage applied to a power converter is detected by a voltage detector, a function generator produces a voltage proportional to this detected voltage, and a high-pass filter detects an AC component superimposed on the voltage. An adder adds a bias voltage to this AC component, and an adder adds the output from the adder and the output from the function generator. The output from the adder is compared with a triangular wave produced from a rectangular wave generator, and a switching element is controlled to make switching operation according to the compared result. When a DC current is decreased by the AC component, a resistance current Ib is increased so that the AC components superimposed on the current and resistance current can be cancelled out.

5 Claims, 5 Drawing Sheets

METHOD FOR CONTROLLING A VEHICLE PROVIDED WITH AN ELECTRIC POWER CONVERTER

This application is a continuation of application Ser. No. 10/101,529, filed Mar. 20, 2002.

BACKGROUND OF THE INVENTION

The present invention generally relates to DC apparatus, and particularly to a DC apparatus suited to use as a power supply a DC voltage produced by restriction of AC components of source current.

Recently in the field of railroad vehicles, a system has become popular in which electric rolling stocks are driven by induction motors controlled by the output from a power converter that converts the DC voltage of overhead wire to an AC voltage of variable frequency/variable voltage.

In the railroad vehicles employing this type of system, the DC return current fed from overhead wire to the power converter is caused to flow to the rail along which the vehicle runs, and the rail is used as a railroad circuit through which a protective device installed on the ground can detect the presence of a vehicle. Therefore, if the return current to the power converter includes the same frequency component as the AC signal that flows in the railroad circuit, i.e., disturbance current, the railroad circuit could have erroneous operation. Thus, when the electric rolling stock running on the railroad is driven by the induction motor, it is necessary to remove the disturbance current included in the return current. Since the return current flowing in the railroad and the line current flowing in the filter reactor have the same value, the line current will hereafter be used unless otherwise noted.

The disturbance current included in the line current can be removed by the filter reactor, and filter condenser provided between the overhead wire and the power converter, but it is necessary to increase the inductance of the filter reactor and the capacitance of the filter condenser in order that the railroad circuit can be used at lower frequencies such as 25 Hz or 30 Hz as in the frequency division/multiplication railroad circuit. However, the increase of the capacitance and inductance of these elements will increase the weight, thus causing such problems as reduction of acceleration/deceleration performance, or increase of consumption power.

Thus, JP-A-57-145503 describes the system in which the disturbance current component included in the voltage across the filter condenser is detected and used to regulate the frequency of the induction motors, thereby reducing the disturbance current.

There is also proposed another system in which a resistor and a switching element connected in series are connected in parallel with the filter condenser, and a diode is connected in parallel with the resister so that the voltage across the filter condenser can be detected by a voltage detector. In addition, the output from the voltage detector is supplied to a function generator, which then produces 0 when the voltage $E_{cf}$ of the filter condenser is less than a first reference voltage E1, 1 when the voltage $E_{cf}$ of the filter condenser is equal to or larger than a second reference voltage E2, and a voltage proportional to the difference between the $E_{cf}$ and the first reference voltage E1 when it is equal to or larger than E1 and less than E2. The output from the function generator is fed to a comparator, and a triangular wave with an amplitude of 0~1 generated from a triangular wave generator is also applied to the comparator so that the triangular wave and the output from the function generator can be compared by the comparator. If the output from the function generator is larger than the triangular wave, the switching element is made conductive. If the output from the function generator is less than the triangular wave, the switching element is made nonconductive. Thus, the switching element is controlled on and off according to the output from the comparator so that the current bypassing the power converter can be controlled.

According to this system, when the induction motor is decelerated, a torque opposite to the rotation direction is generated, so that the kinetic energy of the induction motor is converted to electric energy, and that the AC current fed to the power converter is converted to DC current. In other words, when the induction motor is regeneratively driven, the electric energy is regenerated on the overhead wire through the power converter. However, when the electric energy cannot be regenerated through the overhead wire to the DC power supply, the voltage $E_{cf}$ of the filter condenser is increased. If the filter condenser voltage $E_{cf}$ is excessively increased, the power converter and the filter condenser will sometimes break down.

Thus, in order to prevent this damage, the output of the function generator is set to be large, and the conduction period of the switching element is increased so that the current flowing in the resistor is controlled to increase. The increase of the current flowing in the resistor will result in much consumption of electric energy in the resistor, and hence the voltage $E_{cf}$ of the filter condenser can be suppressed from rising. The diode acts to make the current due to the induction component of the resistor flow back when the switching element is made off.

SUMMARY OF THE INVENTION

It is an object of the invention to provide a DC apparatus capable of suppressing an AC component included in the amount of DC electricity supplied from a DC power supply, and a vehicle using the same.

According to the former of the conventional examples, the disturbance current can be attenuated, but since the line current is controlled by regulating the frequencies of induction motors, delay is caused in control between the frequency as the amount to be handled and the line current as the amount to be controlled. In addition, since the characteristic is changed depending on the operation condition of the induction motors, the disturbance current cannot be effectively suppressed, and the amount of the attenuation is limited.

In the latter of the conventional examples, when the voltage $E_{cf}$ of the filter condenser is increased, and when the switching element makes switching operation, i.e., at the time of regenerative operation, the disturbance current included in the line current can be suppressed, but when the voltage $E_{cf}$ of the filter condenser is decreased, or when the motors make powering operation, the switching element is turned off, and thus the disturbance current cannot be suppressed.

According to the invention, in order to solve these problems, there is provided a DC apparatus having an electric equipment that operates according to the amount of DC electricity supplied from a DC power supply, an electric-amount detector for detecting the amount of DC electricity from the DC power supply, an AC component detector for detecting an AC component superimposed on the detected output from the electric-amount detector, and a control system for controlling the current that bypasses the electric equipment on the basis of the detected output from the AC component detector.

Also, according to the invention, there is provided a DC apparatus having an electric equipment that operates according to the amount of DC electricity supplied from a DC power supply, an AC component detector for detecting an AC component superimposed on the amount of DC electricity from the DC power supply, and a control system for controlling the current that bypasses the electric equipment on the basis of the detected output from the AC component detector.

When each of the above DC apparatus is constructed, the following elements can be added.

(1) The control system has a switching element connected in parallel with the electric equipment in order to control a current that bypasses the electric equipment on the basis of a switching signal, and a switching controller that generates the switching signal on the basis of the detected output from the AC component detector, thereby controlling the switching operation of the switching element.

(2) The switching controller generates the switching signal on the basis of the detected output from the AC component detector so that the AC component superimposed on the amount of DC electricity supplied to the DC apparatus and an AC component superimposed on the current flowing in the switching element can be cancelled out.

(3) The switching controller generates the switching signal by which the switching element is made conductive at least once during each second when the amount of DC electricity from the DC power supply is equal to or lower than a first setting value and equal to or higher than a second setting value that is lower than the first setting value.

(4) The amount of DC electricity is a DC voltage.

(5) The DC apparatus further has a reactor connected in series with the DC power supply, and a condenser connected in parallel with the electric equipment, and the electric-amount detector detects the voltage across the condenser.

(6) The DC apparatus further has a reactor connected in series with the DC power supply, and a condenser connected in parallel with the electric equipment, and the AC component detector detects the voltage across the reactor.

(7) The electric equipment is a power converter for converting a DC voltage to an AC voltage.

(8) Electric motors are connected to the AC output side of the power converter.

In addition, according to the invention, there is provided a vehicle having the DC apparatus as the power converter, wherein the wheels are driven by the induction motors connected to the power converter.

According to the above DC apparatus, the AC component superimposed on the detected output from the electric-amount detector or the AC component superimposed on the amount of DC electricity from the DC power supply is detected, and the current that bypasses the electric equipment can be controlled on the detected output. Thus, the AC component superimposed on the amount of DC electricity supplied from the DC power supply can be suppressed.

In other words, the current for canceling out the AC component of the disturbance current flowing in the electric equipment that is the source of the disturbance current is caused to flow in the control system as a current that bypasses the electric equipment, thereby making it possible to suppress the disturbance current that is the AC component included in the amount of DC electricity.

Thus, according to the invention, as described above, the AC component superimposed on the amount of DC electricity supplied from the DC power supply can be suppressed without increasing the size of the filter reactor and filter condenser.

Other objects, features and advantages of the invention will become apparent from the following description of the embodiments of the invention taken in conjunction with the accompanying drawings.

DESCRIPTION OF THE EMBODIMENTS

Embodiments of the invention will be described with reference to the drawings.
(First Embodiment)

Figure 1:
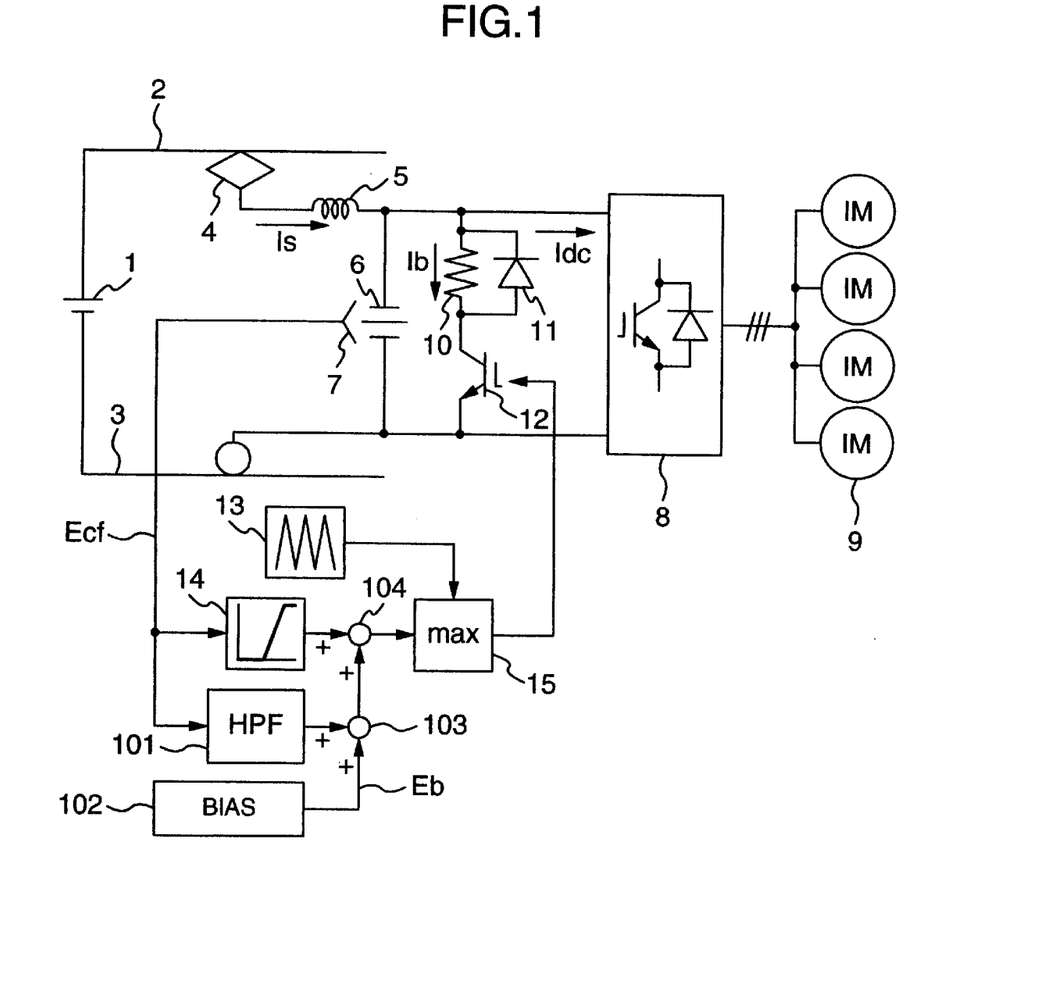
FIG. 1 is a block diagram of a DC apparatus showing the first embodiment of the invention.

FIG. 1 is a block diagram of a DC apparatus showing the first embodiment of the invention. Referring to FIG. 1, an overhead wire, or line 2 and a railroad 3 are connected to a DC power supply (1500 V) 1, and a pantograph 4 is made in slidable contact with the line 2 in order to introduce the amount of DC current from the DC power supply 1. A filter reactor 5 is connected to the output side of the pantograph 4, and a filter condenser 6, a power converter 8 and so on are connected on the output side of the filter reactor 5. The filter condenser 6 is connected in parallel with the DC input side of the power converter 8. A voltage detector 7 for detecting the DC voltage as the amount of DC current from the output of the DC power supply 1 is provided across the filter condenser 6. In addition, a resistor 10 and a switching element 12 connected in series are connected in parallel with the filter condenser 6. A diode 11 is connected across the resistor 10. The switching element 12 is, for example, IGBT.

The power converter 8 has a plurality of switching elements, and diodes respectively connected in parallel with each of the switching elements and in a back-to-back manner. This power converter 8 responds to a switching signal to convert the DC voltage to an AC voltage of variable frequency/variable voltage, and to supply the converted AC voltage to four induction motors 9. Each induction motor 9 is interconnected to wheels. When the wheels are driven to rotate by the induction motors 9, the vehicle runs along the railroad 3.

The switching element 12, resistor 10 and diode 11 are connected as one element of a control system for controlling the current that bypasses the power converter 8 as electric equipment. The control system in this embodiment has a triangular wave generator 13, a function generator 14, a comparator 15, a high-pass filter 101, a bias generator 102 and adders 103, 104 provided as a switching controller for controlling the switching operation of the switching element 12.

Figure 2:
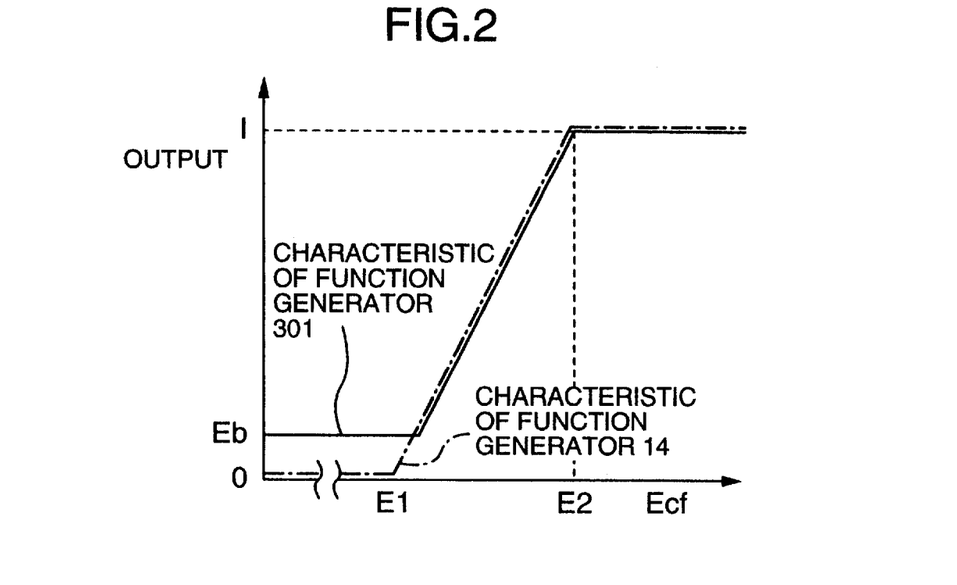
FIG. 2 is a graph to which reference is made in explaining the characteristics of the function generator.
Figure 3:
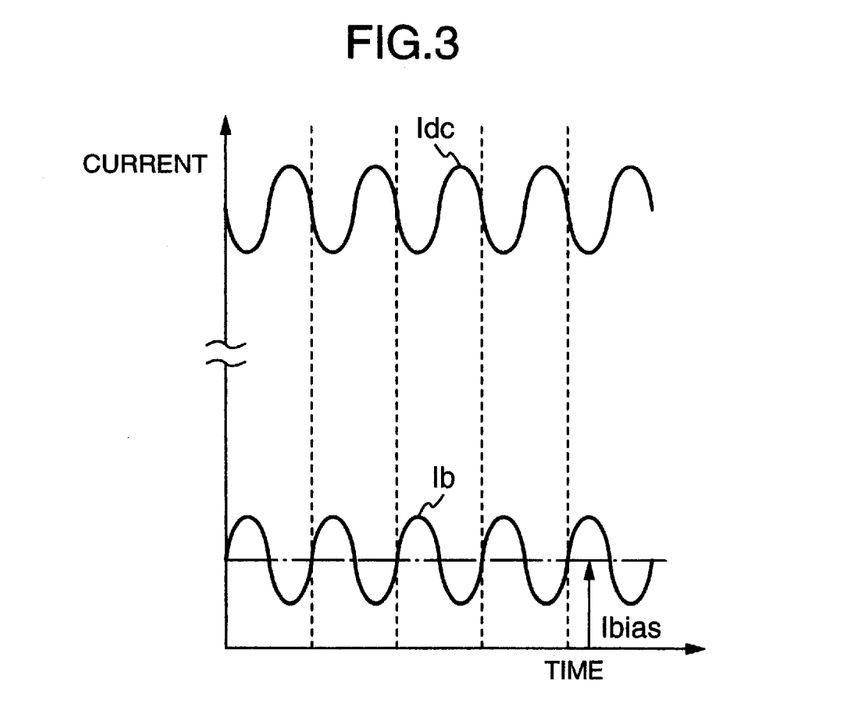
FIG. 3 is a waveform diagram showing the relation between the resistance current and the DC current.

The triangular wave generator 13 supplies a triangular wave having amplitudes of 0~1 to the comparator 15. The function generator 14 supplies to the adder 104 a signal proportional to the voltage detected by the voltage detector 7. This function generator 14 produces, as shown in FIG. 2 by the one-dot chain line, 0 when the value of the filter condenser voltage $E_{cf}$ detected by the voltage detector 7 is equal to or lower than the first reference voltage E1, 1 when the voltage $E_{cf}$ is equal to or larger than the second reference voltage E2, and a signal of amplitude (0~1) proportional to the difference between the filter condenser voltage $E_{cf}$ and the first reference voltage E1 when the $E_{cf}$ is equal to or larger than E1 and smaller than E2.

The high-pass filter 101 has a cut-off frequency of, for example, a few hundreds Hz and is constructed as an AC component detector for detecting the AC component superimposed on the filter condenser voltage $E_{cf}$. The signal of AC component (AC signal of 25 Hz or 30 Hz) from the high-pass filter 101 is supplied to the adder 103. The bias generator 102 supplies a bias voltage Eb to the adder 103. The adder 103 adds the AC component produced from the high-pass filter 101 and the bias voltage Eb, and supplies its output signal to the adder 104. The adder 104 adds the output from the function generator 14 and the output from the adder 103, and supplies its output to the comparator 15. The comparator 15 compares the output voltage from the adder 104 and the triangular wave from the triangular wave generator 13, and supplies to the switching element 12 a switching signal with its pulse width changed according to the compared result.

In this case, the comparator 15 generates the switching signal so that the AC component superimposed on the DC current $I_{dc}$ fed to the power converter 8 and the AC component superimposed on the resistance current Ib flowing in the switching element 12 can be kept cancelled out. This switching signal is used to make the switching element 12 operative in a switching manner, thereby canceling out the AC component that causes the disturbance current.

The specific operations of this embodiment will be described. First, a description will be made of the case when the output from the function generator 14 is 0, i.e., when the filter condenser voltage $E_{cf}$ is equal to or less than the first reference voltage E1 in the characteristic of function generator 14.

When an AC component is included in the DC current $I_{dc}$ flowing to the power converter 8, this AC component is attenuated by the filter circuit formed of the filter reactor 5 and the filter condenser 6. A part of the AC component flows as an AC component of line current Is, and serves as the disturbance current to damage to the railroad circuit. At this time, the filter condenser voltage $E_{cf}$, on which we now focus attention, increases when the DC current $I_{dc}$ is decreased by the AC component. Since this increment is the AC component, it is passed through the high-pass filter 101 without attenuating, and fed to the adder 103, so that the output from the adder 104 increases. The output from the adder 104 is compared with the output from the triangular wave generator 13 in the comparator 15. The output from the comparator 15 makes the switching element 12 operative in a switching manner, thus determining the period of the current flowing in the resistor 10.

Therefore, when the output from the adder 104 is increased, and when the period of the current flowing in the resistor 10 increases, the average value of the resistance current Ib in the resistor 10 increases, thus making it possible to cancel out the DC current $I_{dc}$ that is decreased by the AC component so that the disturbance current can be suppressed.

When the DC current $I_{dc}$ is increased by the AC component, the filter condenser voltage $E_{cf}$ is decreased, and the output from the high-pass filter 101 for detecting the AC component decreases. When the output from the high-pass filter 101 decreases, there is a fear that, under this condition, the output from the adder 104 becomes negative, and that the conduction period of the switching element 12 is negative. In this embodiment, however, the bias voltage Eb is fed to the adder 103 in order that the output from the adder 104 can be prevented from being negative. Therefore, even though the DC current $I_{dc}$ is increased, the AC component for canceling out the AC component of DC current $I_{dc}$ flows as the resistance current Ib, thus making it possible to suppress the disturbance current.

A description will be made of the case when the output from the function generator 14 is larger than 0. In this case, since the function generator 14 produces a signal of the intensity proportional to the difference between the first reference voltage E1 and the filter condenser voltage $E_{cf}$, the output from the function generator 14 increases with the increase of the input voltage when the DC current $I_{dc}$ decreases and when the filter condenser voltage $E_{cf}$ increases. At this time, the output from the high-pass filter 101 is increased, and the output from the adder 103 is increased with the increase of the AC component superimposed on the filter condenser voltage $E_{cf}$. In other words, the output from the function generator 14 and the filter condenser voltage $E_{cf}$ can be suppressed from increasing. Therefore, the AC component for canceling out the AC component of the DC current $I_{dc}$ flows as resistance current Ib, thus making it possible to suppress the disturbance current. In addition, when the DC current $I_{dc}$ is increased, the disturbance current can be suppressed by the same operation.

Thus, this embodiment considers that the AC current included in the DC current $I_{dc}$ and causing the disturbance current changes the filter condenser voltage $E_{cf}$, and makes the switching element 12 be operated in a switching manner according to this consideration so that the disturbance current can be suppressed.

When the output from the function generator 14 is near 1, and when the output from the adder 104 becomes equal to or larger than 1, the off-period of the switching element 12 cannot be reduced to less than 0, and thus the increment of DC current cannot be cancelled out.

Therefore, it is necessary to select the resistor 10 so that the output from the adder 104 does not exceed 1. Moreover, when the output from the adder 104 becomes near 1, the power converter 8 may be controlled so that the regenerative current to the power converter 8 can be suppressed.

Thus, according to this embodiment, the disturbance current can be suppressed by making the switching element 12 always operative in a switching manner without dependence on the magnitude of the filter condenser voltage $E_{ef}$ and power regenerative condition.

In the conventional examples, when the filter condenser voltage is equal to or less than the first reference voltage E1 at which the output from the function generator is 0, the output from the function generator becomes smaller than the output from the triangle wave generator, and thus the switching element is not made conductive.

In this embodiment, even though the output from the function generator 14 and the output from the high-pass filter 101 are both 0, the bias voltage Eb from the bias generator 102 makes the switching element 12 conductive at least once in each period of the triangle wave from the triangle wave generator 13.

However, when the filter condenser voltage $E_{cf}$ has become larger than the first setting voltage, the operation is stopped in order that the switching element 12 can be prevented from breaking down due to overvoltage. In other words, the switching element 12 is not made conductive. When the filter condenser voltage $E_{cf}$ has become less than the second setting voltage that is lower than the first setting voltage, an abnormal situation is more likely to occur on the DC power supply 1 or line 2, and hence the operation is stopped. In the other cases, i.e., when the filter condenser voltage $E_{cf}$ is equal to or lower than the first setting voltage and equal to or higher than the second setting voltage that is lower than the first setting voltage, the switching element is made conductive at least once in each period of the triangle wave from the triangle wave generator 13.

In addition, the period of the triangle wave from the triangle wave generator 13 is desired to have at least one second or less depending on the required response. Thus, when the filter condenser voltage $E_{cf}$ is equal to or higher than the first setting voltage and equal to or lower than the second setting voltage, the switching element 12 is made conductive at least once in each second, so that current flows in the resistor 10.

(Embodiment 2)

Figure 4:
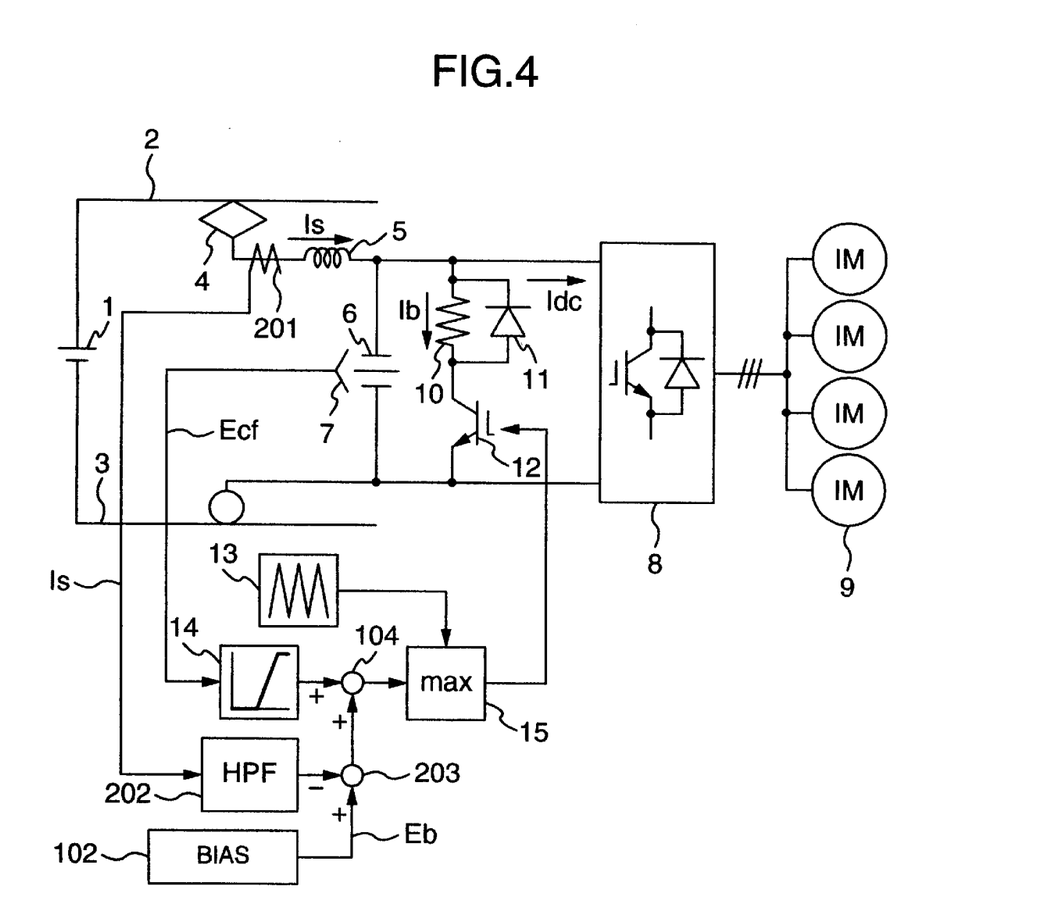
FIG. 4 is a block diagram of a DC apparatus showing the second embodiment of the invention.

The second embodiment of the invention will be described with reference to FIG. 4. In this embodiment, a current detector 201 for detecting line current $I_s$ is provided, and the output from the current detector 201 is supplied to a high-pass filter 202. The high-pass filter 202 removes the DC component, and supplies to a subtracter 203 an AC component that is included in the line current with the DC component removed, i.e., the line current $I_s$. The subtracter 203 subtracts the output of the high-pass filter 202 from the bias voltage Eb, and supplies the subtracted result to the adder 104. The other constructions are the same as shown in FIG. 1.

In other words, while the previous embodiment suppresses the disturbance current by considering that the AC component that is included in the DC current $I_{dc}$ and that causes the disturbance current changes the filter condenser voltage $E_{cf}$, this embodiment uses the current detector 201 by which the line current Is is directly detected, and the high-pass filter 202 that takes the AC component out from the line current Is that includes the AC component, and supplies it to the subtracter in which the AC component is subtracted from the bias voltage Eb.

In this embodiment, when the AC component of the line current Is increases, the resistance current Ib decreases, suppressing the line current Is from being increased, so that the disturbance current can be rejected. When the AC current contained in the line current decreases, the resistance current is increased, thus restricting the generation of the disturbance current.

In this embodiment, unless the output from the adder 104 becomes 1 or more, the output from the function generator 14 has the effect of suppressing the disturbance current as with the embodiment 1, so that the disturbance current suppressing effect is not inhibited by the above operation.

(Third embodiment)

Figure 5:
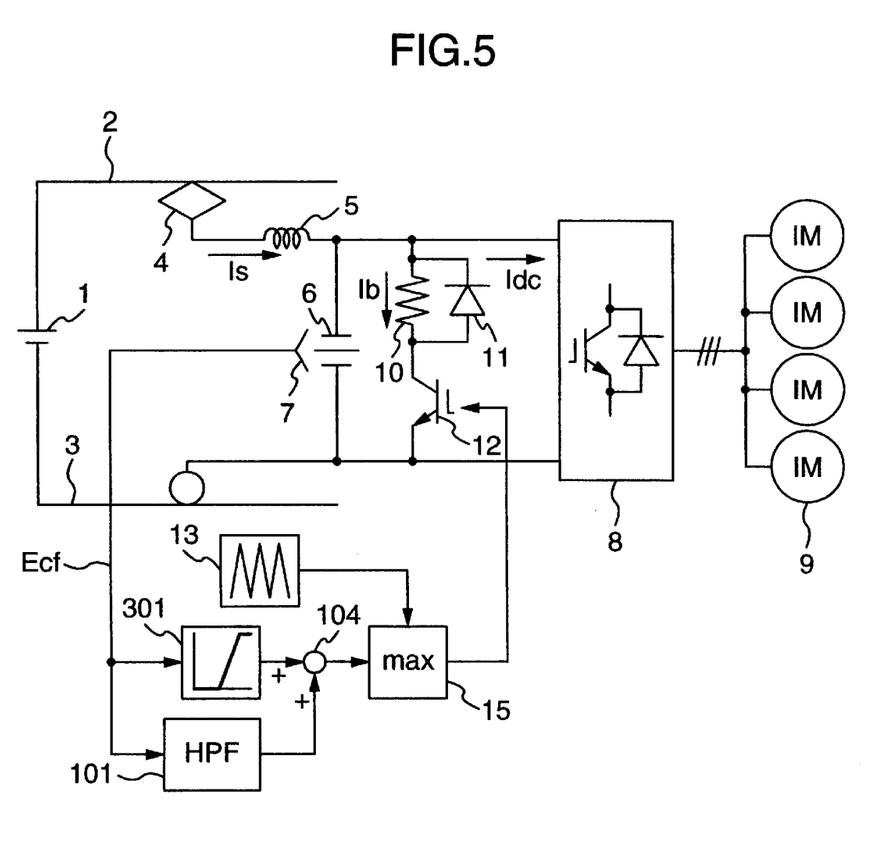
FIG. 5 is a block diagram of a DC apparatus showing the third embodiment of the invention.

The third embodiment of the invention will be described with reference to FIG. 5. In this embodiment, the bias generator 102 and adder 103 shown in FIG. 1 are not used, and a function generator 301 is provided in place of the function generator 14. The other constructions are the same as in FIG. 1.

The characteristic of the function generator 301 is shown in FIG. 2 as indicated by the solid line. The output from the function generator 301 is the bias voltage Eb when the filter condenser voltage $E_{cf}$ is equal to or less than the first reference voltage E1, 1 when it is equal to or higher than the second reference voltage E2, and a signal having Eb+the amplitude proportional to the difference between $E_{cf}$ and E1 when it is equal to or higher than E1 and lower than E2. In other words, the characteristic of the function generator 301 has its lowest value set at bias Eb. Thus, the output from the adder 104 can be prevented from being negative, and the switching element 12 can be always made operative in a switching manner without using the bias generator 102 and adder 103.

According to this embodiment, the switching element 12 is always caused to make switching operation without using the bias generator 102 and adder 103 and irrespective of the magnitude of the filter condenser voltage $E_{cf}$ and regenerative powering condition, thus making it possible to suppress the disturbance current.

(Embodiment 4)

Figure 6:
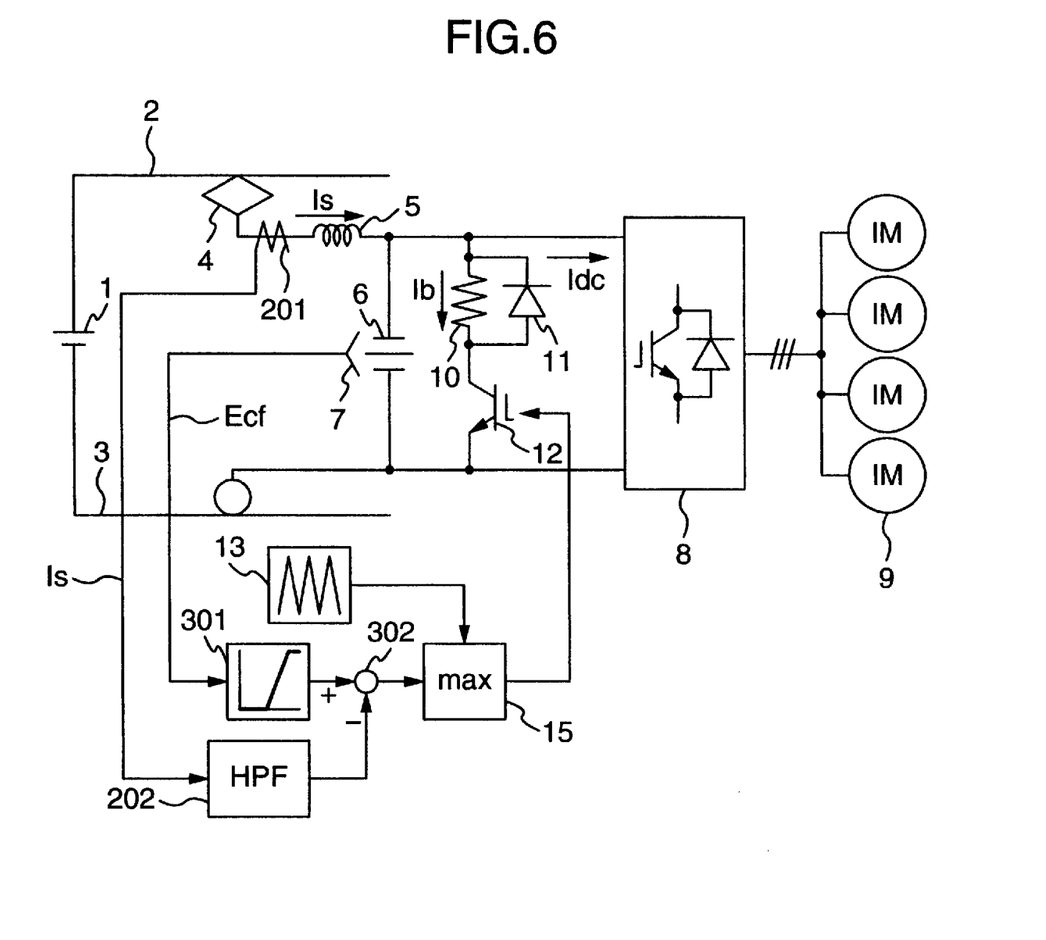
FIG. 6 is a block diagram of a DC apparatus showing the fourth embodiment of the invention.

The fourth embodiment of the invention will be described with reference to FIG. 6. In this embodiment, the high-pass filter 202 is used in place of the high-pass filter 101, the output from the current detector 201 for detecting the line current $I_s$ is supplied to the high-pass filter 202, and a subtracter 302 is used in place of the adder 104 in order to match the sign of the output from the high-pass filter 202. The other constructions are the same as in FIG. 5.

In this embodiment, since the characteristic of the function generator 301 has its lowest value set at bias voltage Eb, the switching element 12 can be always caused to make switching operation without using the bias generator 102 and adder 103, and the disturbance current can be suppressed from occurrence.

According to this embodiment, the switching element 12 can always be caused to make switching operation without using the bias generator 102 and adder 103, and irrespective of the magnitude of the filter condenser voltage $E_{cf}$ and regenerative powering condition, thus making it possible to suppress the disturbance current.

While the power converter 8 is used as electric equipment in each of the above embodiments, it may be other electric equipment if it can be operated by DC power. In this case, the disturbance current to the electric equipment can be suppressed.

While the first and second embodiments provide the function generator 14 and adder 104 in order to restrict the increase of the filter condenser voltage $E_{cf}$ at the time of regenerative operation, the function generator 104 and adder 104 can be removed when only the disturbance current is intended to be suppressed. In this case, since the power consumption in the resistor 10 is decreased, a low-power small resistor can be used.

While the second embodiment and fourth embodiment use the current detector 201 to detect the line current Is, a voltage detector for detecting the voltage across the filter reactor 5 may be used as an AC component detector in place of the current detector 201, so that the disturbance current can be suppressed. In this case, since the voltage across the filter reactor 5 is detected as an AC component, and does not include a DC component, the high-pass filter 202 can be removed.

In each of the above embodiments, other elements than DC power supply 1, line 2 and railroad 3 can be mounted as DC equipment on the vehicle, and the wheels can be driven by the induction motors 9 connected to the power converter 8.

Thus, according to each of the above embodiments, the disturbance current included in the line current Is can be effectively suppressed without increasing the size of the filter reactor 5 and filter condenser 6, and irrespective of the powering/regenerative operation of the induction motors 9.

It should be further understood by those skilled in the art that the foregoing description has been made on embodiments of the invention and that various changes and modifications may be made in the invention without departing from the spirit of the invention and the scope of the appended claims.

What is claimed is:

1. A method for controlling a vehicle provided with an electric power converter converting DC electric power supplied from a DC electric power source through a pantograph into AC electric power, a plurality of induction motors driving wheels using said converted AC electric power, a filter reactor disposed between said pantograph and said electric power converter, and a filter condenser disposed at an output side of said filter reactor, the method comprising the steps of:

providing in said vehicle an electric power semiconductor switching element and a resistor connected in series each other and connected in parallel with said filter condenser; and applying to said electric power semiconductor switching element a control signal canceling an AC component superimposed on DC current supplied to said electric power converter by a current flowing in said electric power semiconductor switching element.

2. A method according to claim 1, wherein said AC component superimposed on DC current supplied to said electric power converter is detected by voltages of both end terminals of said filter condenser.

3. A method according to claim 2, wherein when a voltage between both end terminals of said filter condenser is equal to or smaller than a first predetermined value and equal to or larger than a second predetermined value which is smaller than said first predetermined value, a switching controller generates a switching signal placing said electric power semiconductor switching element in a conduction state at least one time per second.

4. A method according to claim 3, wherein said electric power semiconductor switching element is an IGBT.

5. A method according to claim 3, wherein said switching signal is a pulse width modulation signal.

* * * * *